United States Patent [19]

Hardigg

[11] Patent Number: 4,732,826
[45] Date of Patent: Mar. 22, 1988

[54] THICK-THIN BATTERY JAR

[75] Inventor: James S. Hardigg, Conway, Mass.

[73] Assignee: Hardigg Industries. Inc., Southdeerfield, Mass.

[21] Appl. No.: 943,723

[22] Filed: Dec. 19, 1986

[51] Int. Cl.$^4$ .............................................. H01M 2/02
[52] U.S. Cl. .................................................... 429/176
[58] Field of Search .................. 429/176, 163; 220/22, 220/21, 1 R

[56] References Cited

U.S. PATENT DOCUMENTS

| | | | |
|---|---|---|---|
| 3,269,865 | 8/1966 | Swanson | 429/176 |
| 3,388,007 | 6/1968 | Fiandt | 429/176 X |
| 4,304,826 | 12/1981 | Kendall et al. | 429/176 |
| 4,460,663 | 7/1984 | Stutzbach et al. | 429/176 X |

Primary Examiner—Anthony Skapars
Attorney, Agent, or Firm—Cushman, Darby & Cushman

[57] ABSTRACT

The invention concerns a battery jar having a modified interior side and end wall structure that both increases the electrical rating of the battery and reduces the quantity of material required to produce the battery jar itself. The interior of the jar is divided into upper, middle and lower sections and the wall thickness in each is different. The side wall thickness in the middle section is reduced by about 36-40% of the side wall to 60-64% of the thickness in the upper section and the side wall thickness in the bottom section is reduced by about 16 to about 20% of the upper to 80-84% section sidewall thickness. A plurality of ribs are also used on the end walls to maintain the length dimension within the jar between opposing end walls.

14 Claims, 10 Drawing Figures

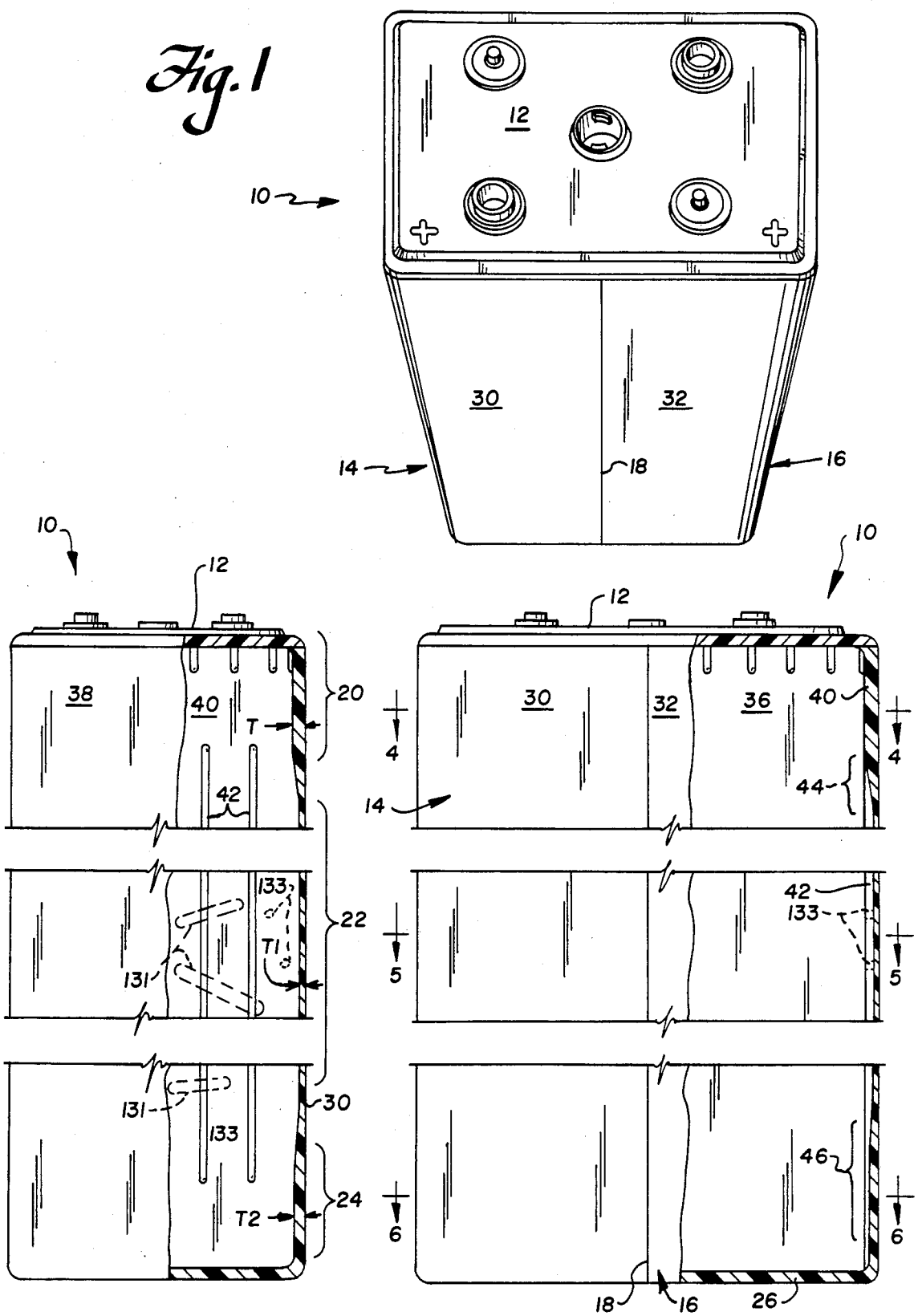

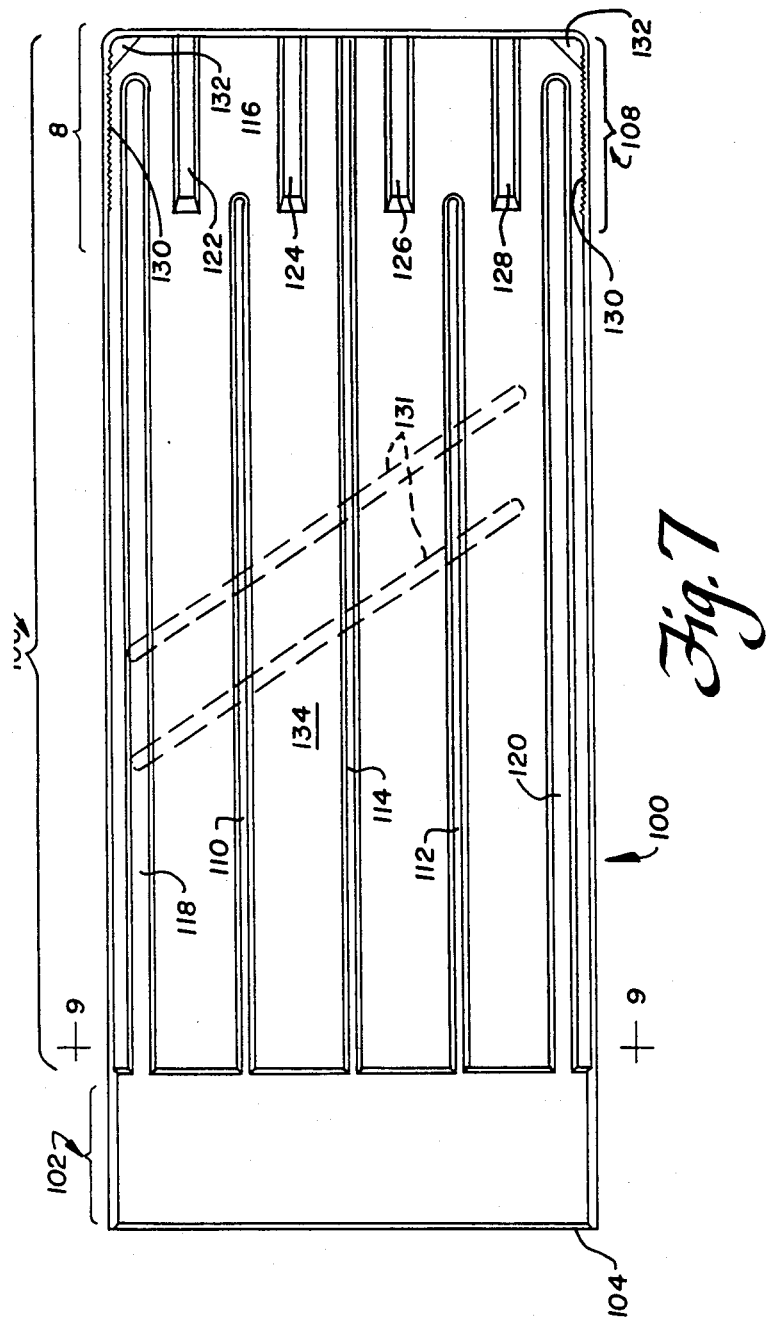
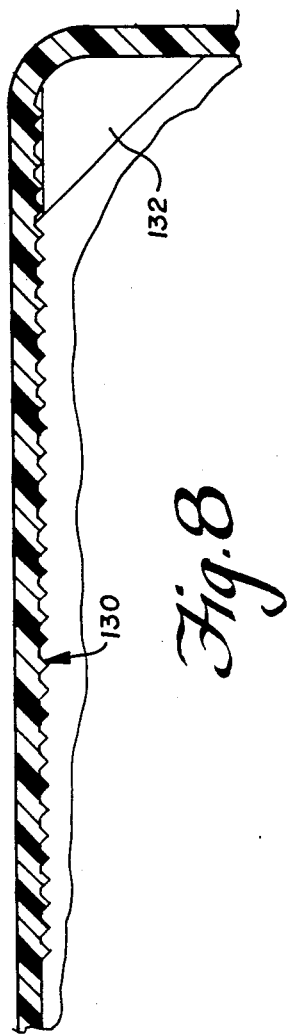
Fig. 7
Fig. 8

THICK-THIN BATTERY JAR

FIELD OF THE INVENTION

This invention relates to a modified type of injection molded battery jar in which the end and side walls of the battery jar are characterized by having a major portion thereof substantially reduced in thickness and where the end walls may have a modified internal wall structure.

BACKGROUND OF THE PRESENT INVENTION

Various types of battery jars have been known for many years and one exemplary example of one such industrial battery jar is set forth in my earlier U.S. Pat. No. 4,118,265. This patent relates to the fabrication of battery jars having elongated side and end walls, using an injection molding process in a way in which satisfactory dimensional control was obtainable by forming the jar from two independent sections. Subsequently those sections were then welded together to form a battery jar having opposing side and end walls, a closed bottom wall and an open top. The thickness of the side walls remained constant. The substance of U.S. Pat. No. 4,118,265 is hereby incorporated by reference.

At the present time, many motive power lead-acid battery cells are characterized by a flat-plate type construction technique. In this type of cell, it is necessary that the plates press snugly against each other to minimize the dropping of active material from them particularly when the battery is subjected to shock or vibration. This tight packing of plates also helps maintain battery performance. The length of each battery jar is determined according to the number of battery plates to be used. Once the battery elements are inserted within the jar the vertical load of those elements is supported on the bottom of the jar. The top of the side and end walls must also provide a suitable top surface which is sufficiently thick so that the top or cover of the battery jar can be heat-welded thereto with a strong and leak-proof joint.

I have now determined that it is possible to increase the electrical rating of a battery by employing additional quantities of battery acid within the battery case and at the same time substantially reduce the amount of plastic necessary to produce the battery jar walls and, in particular, by reducing the thickness of the side and end walls at least in the central portion of the battery jar or along a major portion of those side and end walls. These results are also accomplished without varying the outside dimensions of the battery jar. This process of increasing the electrical rating of the battery and reducing the amount of plastic must not decrease the precision required in forming the jar itself through injection molding techniques, and must continue to permit the development of an accurately dimensioned upper portion in order to provide the necessary cover-to-jar weld and the resulting joint. Additionally, bursting pressures of the battery jar must be maintained as it is not desirable to modify the side and end wall structure to the point that they will tear, crack or not be suitably weldable.

SUMMARY OF THE PRESENT INVENTION

The present invention involves the creation of an improved, larger volume battery jar while simultaneously reducing the plastic required to produce the jar. In one embodiment the battery jar can be divided into upper, middle and lower portions with the upper portion having internal wall dimensions which remain conventional or at standard values. The lower portion of the battery jar adjacent the bottom can be formed with side and end walls that are reduced in overall cross-sectional thickness relative to the wall thickness at the top but not as reduced in thickness as much as the middle section which has a substantial thickness reduction. In order to maintain the desired length of the battery jar as established by the interior dimension at the top thereof so that the battery plates will be tightly pressed together in the length direction, a plurality of spaced apart ribs are included integrally formed on the opposing end walls so that they will span between the upper portion and the bottom of the battery jar. Each rib will have a height sufficient to substantially accommodate the change in thickness between the portions so that the whole interior end wall surfaces are substantially coplaner with the interior surface defined at the upper portion of the battery jar. The ribs will provide some reinforcing for the walls on which they are positioned.

In a second embodiment, the jar is divided into only upper and lower portions, with the side and end walls in the lower portion having a substantially reduced cross-sectional thickness.

Other objects, features, and characteristics of the present invention, as well as the methods and operation and functions of the related elements of the structure, and to the combination of parts and economies of manufacture, will become apparent upon consideration of the following description and the appended claims with reference to the accompanying drawings, all of which form a part of this specification, wherein like reference numerals designate corresponding parts in the various figures.

BRIEF DESCRIPTION OF THE DRAWINGS

FIG. 1 is a perspective view of a battery case according to the present invention;

FIG. 2 is an end elevational view of the battery jar shown in FIG. 1 with portions of the near end wall being cut away to show the interior details;

FIG. 3 is a side elevational view of the battery jar shown in FIG. 1 with the portions of the near side wall cut away to show interior details;

FIG. 7 is a side elevational view of the interior end wall of a second embodiment of a battery jar according to the present invention;

FIG. 8 is an enlarged cross-sectional view of the lower corner identified by bracket 8 of the battery jar shown in FIG. 7;

DETAILED DESCRIPTION OF THE EMBODIMENT OF THE PRESENT INVENTION

Figure 4:
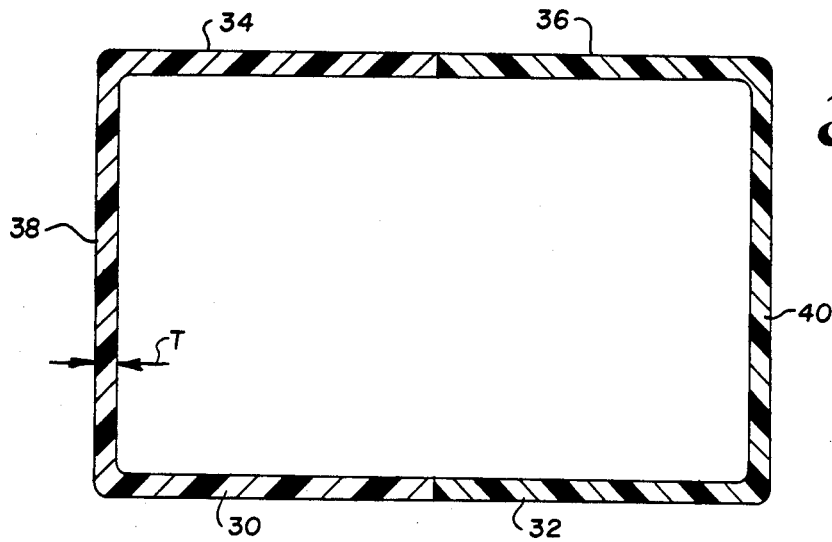
FIG. 4 is a cross-sectional view taken along line 4—4 in FIG. 3.
Figure 5:
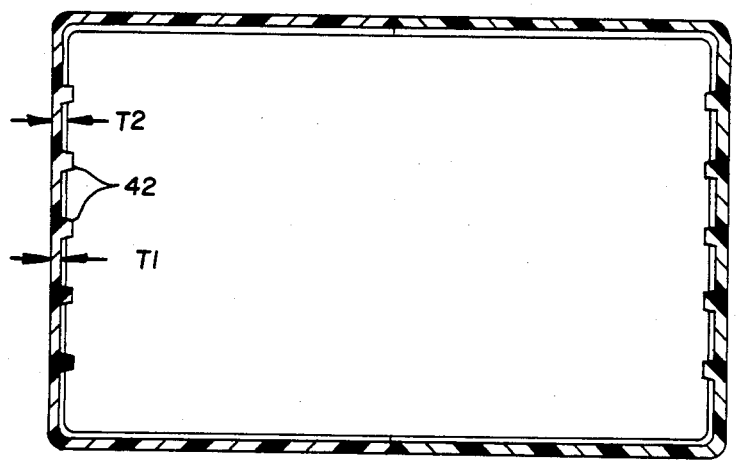
FIG. 5 is a cross-sectional view taken along line 5—5 in FIG. 3.
Figure 6:
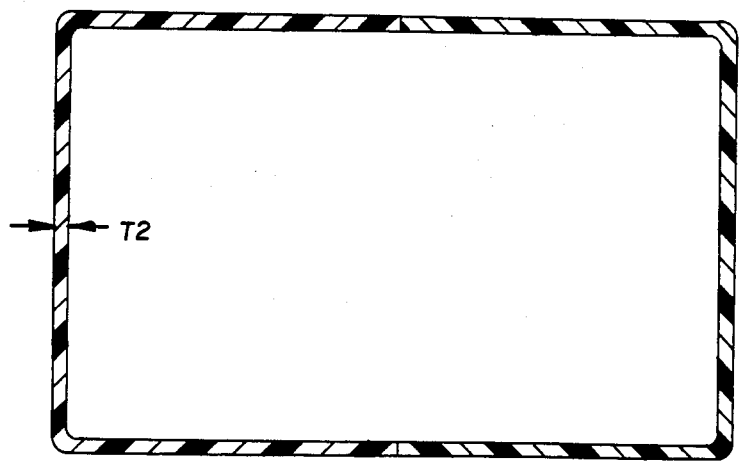
FIG. 6 is a cross-sectional view taken along lines 6—6 in FIG. 3.

The battery case, generally indicated at 10 in FIG. 1, is comprised of a cover 12, and a jar body formed from two identical halves 14 and 16 which are welded together along a flattened seam 18. As shown in FIGS. 2 and 3, the battery jar itself can be divided into an upper portion, generally indicated at 20, a middle portion, generally indicated at 22, and a lower portion generally indicated at 24 terminating at the bottom 26. The side wall thickness in the upper portion 20 desirably has a uniform thickness at T while the thickness of the middle section is greatly reduced and is indicated at T1. The thickness in the lower section lies between T and T1 and is indicated at T2. The T dimension will preferably vary from about 0.095 inches to 0.100 inches, T1 will be about 0.060 inches and T2 will be about 0.080 inches. The vertical height of the battery jar can vary between 10 and 29 inches although jar heights of as great as 35 inches have also been used. Normally, heights will be about 10, 16, 21 and 29 inches. It is also preferred that the upper portion have its wall thickness T extend downwardly from the top edge for a distance approximately equal to 2 to 3 inches from the top edge of the battery jar. Following jar formation, this upper portion will be trimmed to yield a jar with the desired height. Accordingly, the height of the upper section will be less than the initially formed 2 to 3 inch height and the minimum final trimmed height is about ¼ inch. Similarly, the lower portion can also extend upwardly from the bottom of the jar for approximately 2 to 3 inches with the middle portion 22 having a height defined by the distance between the upper and lower portions with the height varying depending upon the overall height of the jar.

The battery jar 10 includes side wall segments 30, 32, 34 and 36, as shown in FIG. 4, as well as opposing end walls 38 and 40. The interior of each of the end walls 38 includes structure that will extend down the length of the end wall where thickness has been changed to maintain the plane established by the interior surface in the upper section. In this way the length dimension between opposing end walls will be maintained and will be the structure against which the flat sides of the outer battery plates will lie. This structure, for example, can be comprised of a plurality of vertically extending ribs 42 which have a thickness that will progressively vary beginning from the point the upper wall portion thickness changes from T to T1, as shown in FIG. 3. In the middle portion 22 the height or thickness of the ribs will varying from about 0.035 to about 0.040. This tapering is generally indicated in FIG. 3 at 44.

Similarly, the height or thickness of rib 42 will progressively lessen in a tapered fashion in the bottom area, indicated at 46, where the end wall thickness changes from T1 to T2 with the height of the rib in the lower area varying from about 0.015 inches to about 0.020 inches. In this way the outer surface of each rib 42 will lie in the same vertical plane established by the interior surface of the end wall 40 in the upper portion 20 of the battery jar 10 and continues that vertical plane down to the bottom 26 of the battery jar. In this way, the length of the battery jar between end walls will remain constant not withstanding that the wall thickness itself will vary along the total height of the battery jar.

Alternatively, the structure could include a plurality of spaced apart portions of such ribs, a series of rounded projections that would extend upwardly from the interior end wall surface. Also, the structure could be comprised of a series of angled rib's, of various shapes or cross-sectional configurations, that would extend across only a portion of the interior surface of the end wall. Regardless of the exact shape, design or configuration, the interior portion of such structures will all substantially lie in a common plane which is co-planar with the interior surface of the upper section.

Figure 9:
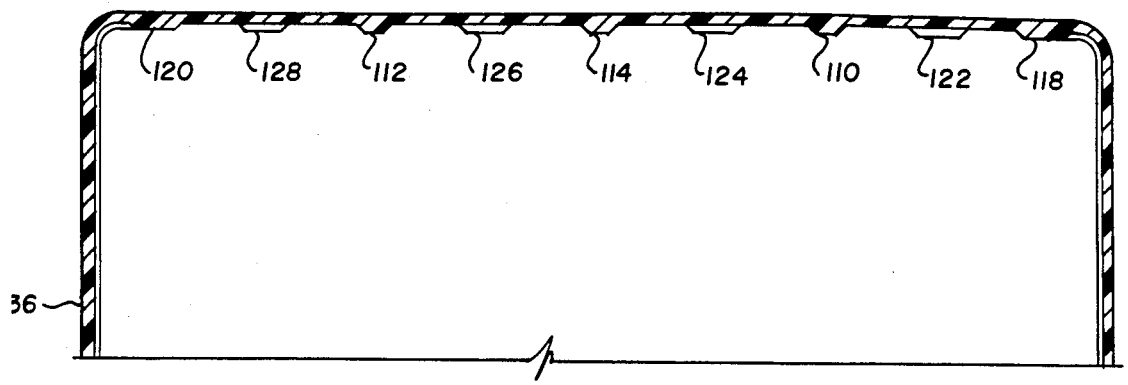
FIG. 9 is a cross-sectional view of the battery jar taken along line 9—9 in FIG. 7.
Figure 10:
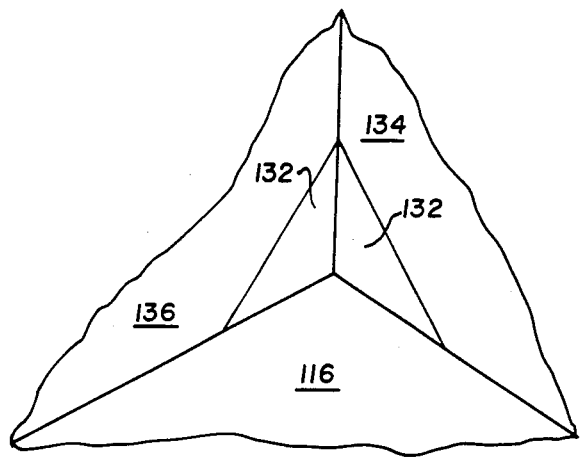
FIG. 10 is a perspective view partly broken away for clarity of a lower corner of the battery jar of FIG. 8.

Turning now to FIGS. 7-9 a second embodiment of the present invention is set forth.

With reference first to FIG. 7, the cross-sectional view of the battery jar, generally indicated at 100, includes an upper portion 102 with the top of the jar being indicated at 104. The bottom portion of the jar, indicated generally at 106, extends downwardly from the upper portion 102 to the bottom 116 with the lower portion of the area 106, which is indicated at 108, and shown in more detail in FIG. 8, includes a serrated portion to be discussed more fully below. A plurality of ribs extend inwardly beginning below portion 102 and down at least a major portion of the length of the side and end wall portion 106, with these ribs being indicated at 110, 112, 114, 118 and 120. A second series of ribs 122, 124, 126 and 128 extend upwardly from the bottom 116.

As shown, rib 114 extends from the bottom 116 to the upper portion 102 while ribs 110 and 112 extend between from the upper portion 102 and a point approximately adjacent the top portion of the upwardly extending ribs 122-128. The outer ribs 118 and 120 each extend between the upper portion 102 and a point adjacent bottom 116 and the interior corners. It should be understood that these rib placements and lengths are merely exemplary and that other variations may be used as well such as spaced apart, angled ribs, arranged in a pattern or randomly that extend at common various angles to the vertical axis of the end wall as shown in phantom at 131 FIGS. 2 and 7. The function could also be served by a plurality of interiorly directed fingers or projections, as indicated in phantom in FIGS. 2 and 3 at 133.

With reference to FIG. 8, the bottom half of the side wall portion 106 includes a serrated area with plurality of teeth generally indicated at 130. Teeth 130 will lie on opposite side walls as indicated in FIG. 7 and will cooperate with bridging structures in order to retain those bridging structures on the bottom of the battery as discussed in my co-pending application U.S. patent application Ser. No. 878,365.

Each of the battery jar corners is also provided with a reinforcing gusset 132 and is formed from a thickened wall portion which extends from the bottom 116 at an angle to and about each of the corner areas.

The bottom 116 will have a thickness of 0.080 inches as will each of the gusset areas 132. Side wall thickness for area 106 is preferably about 0.060 with the wall thickness in the upper area 102 being about 0.095-0.100 inches.

The height of area 102 will preferably be about 2 to 3 inches in its vertical length from top 104 with the final height of this area being somewhat less than the 2 to 3 inches once portion 102 is trimmed to the desired height of the jar after molding and following welding.

It should also be kept in mind, that the end wall ribs 110, 112, 114 and 118-128 can have some portion thereof or be entirely eliminated so that each of the end walls 134 will contain fewer ribs, only a portion of the ribs shown or no ribs at all as is shown for the side walls 136 in FIG. 9.

It is also possible to reduce the overall internal length dimension in the upper section by 0.080 inches between the opposing ends walls while simultaneously leaving the internal length dimension between the end walls in the lower portion the same as that presently used in conventional battery construction. In this instance, since the internal dimension in the upper portion will have been reduced, it would then be necessary to elongate, such as by mechanically stretching, the interior length of the upper section so that the internal dimension would be increased to the same dimension as in the lower section 106 in order to permit the battery elements to be inserted into the jar. Following insertion, the upper section would be released so that the jar could return to its original dimension with the elements tightly packed not only within the lower section 106 but also below the upper section 102.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A battery jar comprised of side, end and bottom walls wherein the side and end walls are divided into upper, middle and lower sections with the wall thickness in each section being T, T1 and T2, respectively, wherein T2 is greater than T1 and less than T.

2. A battery jar as in claim 1, wherein the interior surface of the end walls includes means positioned below the upper section for maintaining the planar surface defined by the interior surface in the upper section.

3. A battery jar as in claim 2 wherein said surface maintaining means is comprised of a plurality of interiorly extending members.

4. A battery jar as in claim 3 wherein the interiorly extending members are comprised of vertically extending ribs.

5. A battery jar as in claim 3 wherein the interiorly extending members are comprised of randomly positioned projections.

6. A battery jar as in claim 3 wherein the interiorly extending members are comprised of angled ribs.

7. A battery jar having side, end and bottom walls wherein the end and side walls are divided into at least upper and lower portions and wherein the upper portion has a wall thickness that is larger than the wall thickness in the lower portion.

8. A battery jar as in claim 7 wherein the wall thickness in the upper section is about 0.095 to about 0.100 inches and the wall thickness in the lower portion is about 0.060.

9. A battery jar as in claim 8 wherein the end walls are provided with a plurality of inwardly extending members having a sufficient thickness interiorly of the end wall so that the end wall thickness at each member is about 0.095 to about 0.100 inches.

10. A battery jar as in claim 7 further including reinforced wall portions adjacent the juncture of the side, end and bottom walls.

11. A battery jar as in claim 1, wherein the innermost surface of the lowermost portion of at least two opposing walls is serrated so as to define a plurality of inwardly directed teeth.

12. A battery jar as in claim 3, wherein the innermost surface of the lowermost portion of said side walls is serrated so as to define a plurality of inwardly directed teeth.

13. A battery jar as in claim 7, wherein the innermost surface of the lowermost portion of at least two opposing walls is serrated so as to define a plurality of inward directed teeth.

14. A battery jar as in claim 9, wherein the innermost surface of the lowermost portion of said side walls is serrated so as to define a plurality of inwardly directed teeth.

* * * * *